(12) United States Patent
Shiota et al.

(10) Patent No.: US 7,468,765 B2
(45) Date of Patent: Dec. 23, 2008

(54) ELECTRO-OPTICAL DISPLAY DEVICE AND IMAGE PROJECTION UNIT

(75) Inventors: Kunihiro Shiota, Tokyo (JP); Hiroshi Tanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 731 days.

(21) Appl. No.: 11/001,240

(22) Filed: Dec. 2, 2004

(65) Prior Publication Data
US 2005/0122447 A1 Jun. 9, 2005

(30) Foreign Application Priority Data
Dec. 3, 2003 (JP) ............................ 2003-404910

(51) Int. Cl.
G02F 1/1333 (2006.01)
(52) U.S. Cl. ...................... 349/110; 349/138
(58) Field of Classification Search ................ 349/110, 349/111, 114
See application file for complete search history.

(56) References Cited

U.S. PATENT DOCUMENTS

| 6,221,544 | B1 | 4/2001 | Hayashi et al. |
| 6,559,913 | B1 | 5/2003 | Sera |
| 6,617,263 | B2 | 9/2003 | Kido |
| 7,199,853 | B2 * | 4/2007 | Koide .................. 349/147 |

FOREIGN PATENT DOCUMENTS

| JP | 2001-004988 A | 1/2001 |
| JP | 2001-066587 A | 3/2001 |
| JP | 2001-133810 A | 5/2001 |
| JP | 2001-133810 A | 5/2001 |
| JP | 2001-305583 A | 10/2001 |
| JP | 2002-091339 A | 3/2002 |
| JP | 2002-131776 A | 5/2002 |
| JP | 2003-021827 A | 1/2003 |

OTHER PUBLICATIONS

W.J. Smith, "Modern Optical Engineering," 1990, pp. 96-99, 2nd Edition, McGraw-Hill, Inc.

* cited by examiner

*Primary Examiner*—David C. Nelms
*Assistant Examiner*—Richard H Kim
(74) *Attorney, Agent, or Firm*—Foley & Lardner LLP

(57) ABSTRACT

An LCD device includes a plurality of pixels each having a slope area configured by a plurality of layers. A shielded element shielded by a black matrix has an inner edge located at a distance X apart from the outer edge of the slope area, the distance X being expressed by the formula: $x = (T1/\cos\beta) \times \sin(\alpha-\beta)$, wherein $\alpha$ and $\beta$ are incidence angle and refracted angle, respectively, of the incident light at an interface between the layers having different refractive indexes in the slope area, and T1 is a thickness of the underlying layer forming the interface.

8 Claims, 16 Drawing Sheets

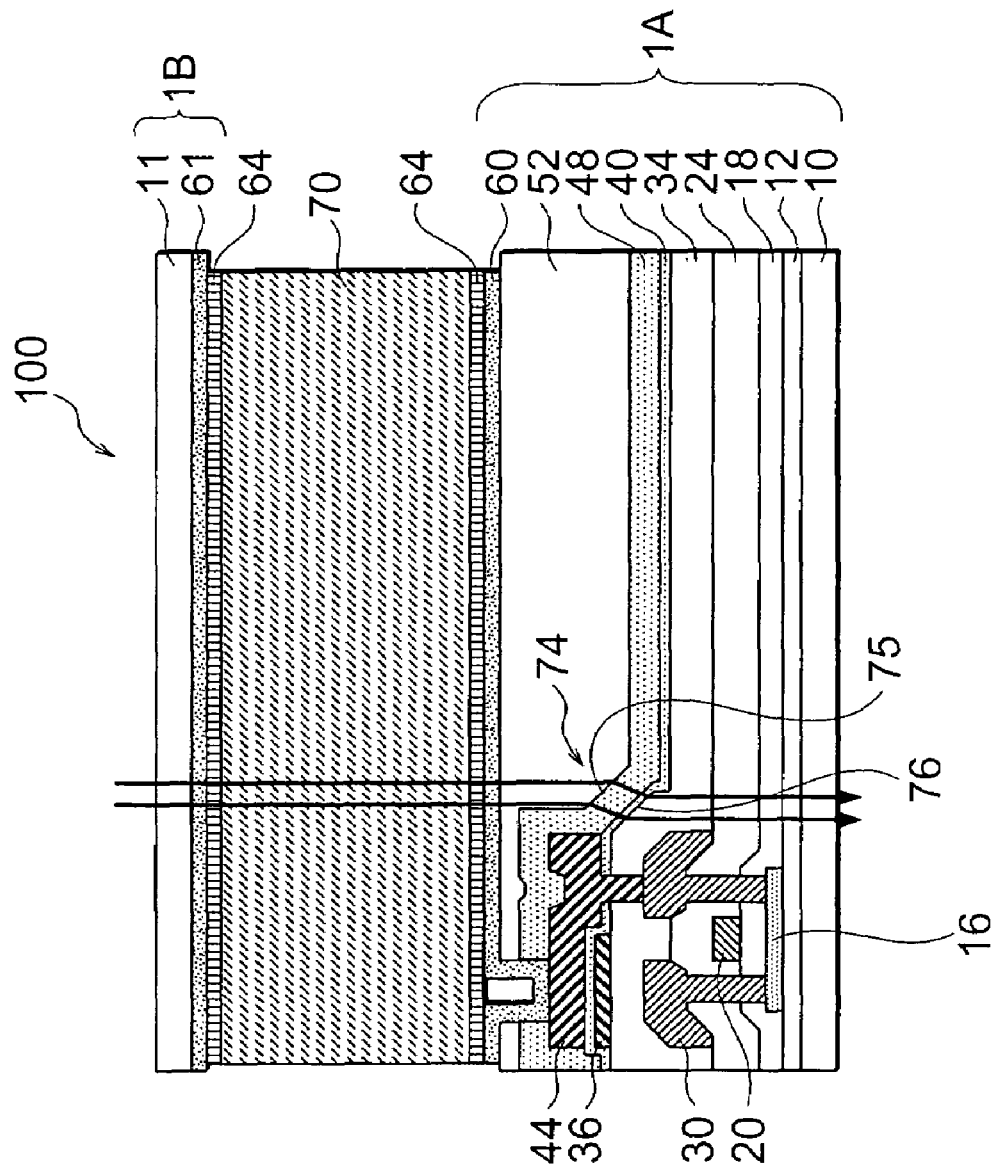

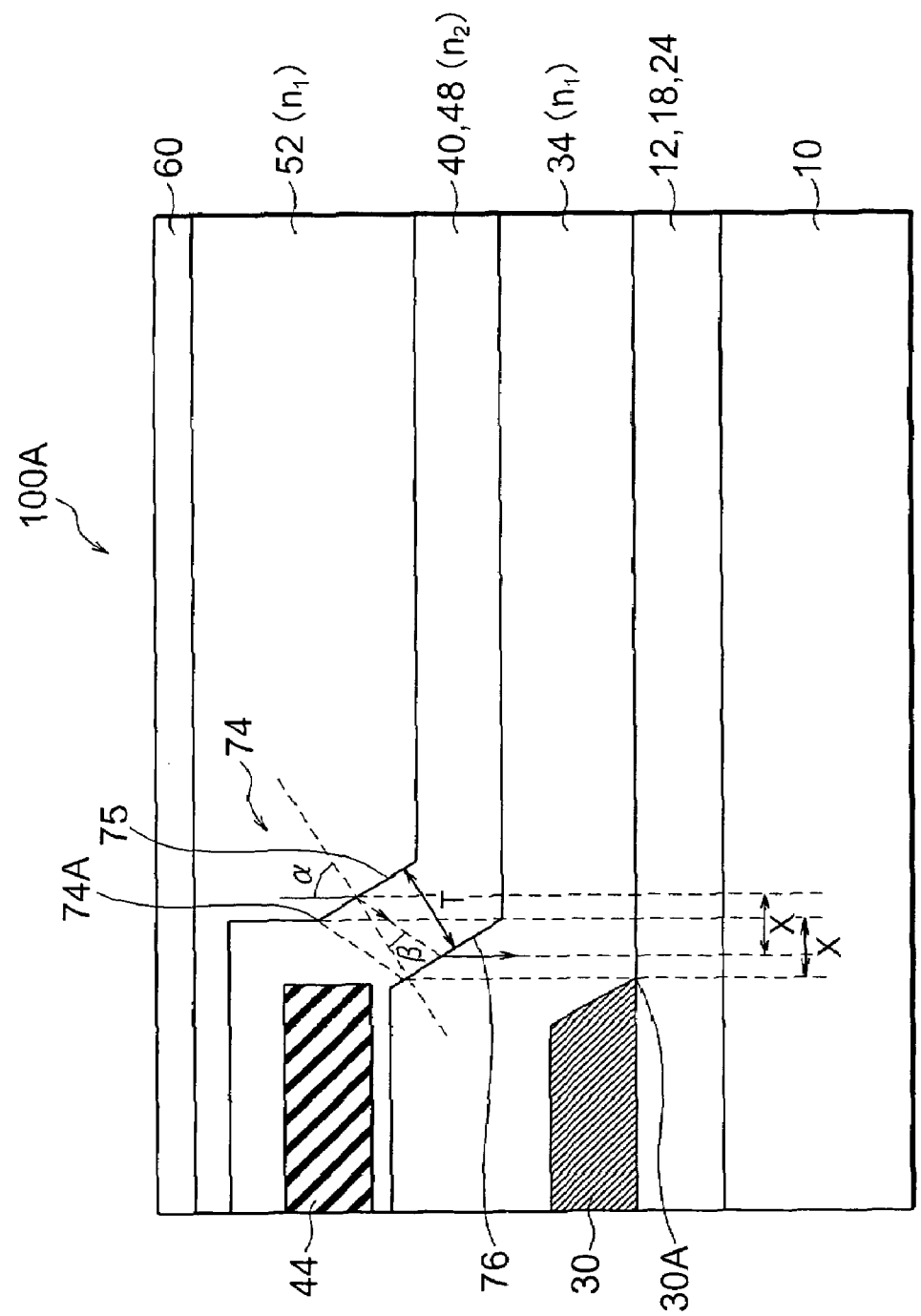

ELECTRO-OPTICAL DISPLAY DEVICE AND IMAGE PROJECTION UNIT

BACKGROUND OF THE INVENTION (a) Field of the Invention

The present invention relates to an electro-optical display device and, more particularly, to an electro-optical display device, such as a liquid crystal display (LCD device), for displaying an image by using an electro-optical effect. The present invention also relates to an image projection unit having such an electro-optical display device.

(b) Description of the Related Art

Some electro-optical display devices such as a liquid crystal display (LCD) device are used as image display units of a direct view type in a variety of equipment, or light valves of image projection units. The electro-optical display device generally includes an electro-optical substance layer such as a liquid crystal (LC) layer and a pair of substrates sandwiching therebetween the electro-optical substance layer. One of the substrates, a TFT substrate, mounts thereon an array of pixels each including a pixel electrode and a switching device such as a TFT (thin film transistor) for driving the pixel electrode, whereas the other of the substrates, a counter substrate, mounts thereon a counter electrode substantially over the entire area.

In an electro-optical display device, light incident onto the counter substrate is modulated by the electro-optical substance and then emitted through the TFT substrate. The TFT substrate mounts thereon interconnections including a plurality of data lines extending in the column direction, a plurality scanning lines extending in the row direction, and a plurality of capacitive lines in association with the respective pixels. These interconnections are disposed within the gap between the opening areas of adjacent two pixels. A shield film pattern, such as a black matrix, covers and thus shields these interconnections, and also shields against leakage light deviated by ill-oriented molecules of the electro-optical substance.

If the electro-optical display device is used as a light valve of an image projection unit, the light from the light source is incident as a parallel ray onto the counter substrate in the direction of the normal line thereof. The incident light passes through the electro-optical substance, to be projected onto a screen by means of an optical system of the image projection unit for display of an image.

In the TFT substrate, a transparent substrate body is generally made of a material including silicon dioxide as a main component thereof. Silicon is used as the semiconductor active layers for the TFTs whereas silicon dioxide is used as the insulating films for the TFTs. The storage capacitor used for increasing the charge-storage capability of the pixel includes a capacitor insulation film made of a high-dielectric-constant material such as silicon nitride. A protective film made of silicon nitride, for example, overlies the TFTs and interconnections for protecting the TFTs and interconnections made of a metal or alloy against water.

Each pixel of an LCD device, for example, includes an opening area divided from the opening area of another pixel and passing therethrough incident light, and a peripheral area shielded by the shield film and encircling the opening area. The peripheral area, or shielded area, encompasses the interconnections and TFT. For improving the brightness of the LCD device, it is desired to increase the open area ratio, which is defined by the ratio of the opening area to the total area of the pixel. In general, the LCD device has an opening area ratio of around 50% at most.

In the LCD device, a slope is generally formed in the vicinity of the TFT due to the layered structure of gate lines and other interconnections. This slope refracts the light incident onto the substrate in the direction normal to the substrate surface. Thus, even the light passed by the shield film pattern within the opening area may be incident onto the TFT or interconnections covered by the shield film pattern. This fact causes the effective open area ratio to be lower than the nominal open area ratio, thereby reducing the brightness of the LCD device. In addition, the light, if it is incident onto the channel of the TFT, generates a leakage current flowing through the TFT during the OFF state thereof, thereby degrading the contrast ratio of the LCD device.

For solving the above problems, it is proposed in Patent Publication JP-A-2001-133810 that a silicon nitride film having a higher refractive index do not protrude from the edge of the shield film toward the opening area. It is also proposed in Patent Publications JP-A-2002-91339 and -2001-4988 that the layered structure has a specific refractive index profile in the slope area. The specific refractive index profile is such that the refractive index decreases along the travelling direction of the light, for refracting the light passing in the vicinity of the edge of the shield film pattern toward the opening area of the pixel, to thereby increase the effective open area ratio.

The proposals by the above publications may suppress the light incident onto the interconnections and TFTs, to improve the transmittance of the LCD device and suppress the leakage current.

It is also proposed in Patent Publication JP-A-2002-131776 that a SiN film having a higher refractive index be removed in the opening area of the pixel to increase the transmittance of the opening area. It is also proposed in Patent Publication JP-A-2001-66587 that a bottom shield film pattern formed between the TFT and the transparent substrate body have a width substantially equal to the width of the corresponding data line, thereby reducing the amount of returned light, which once passes the LCD device and returns thereto by the optical system of the image projection unit to thereby degrade the image quality thereof.

SUMMARY OF THE INVENTION

It is an object of the present invention to provide an electoroptical device, such as an LCD device, capable of suppressing reduction of the contrast ratio and brightness of the electro-optical display device caused by the light refracted toward the interconnections and TFTs after passing through the opening area of the pixel, by using an technique other than the techniques proposed by the publications as described above.

It is another object of the present invention to provide an image projection unit including such a electro-optical display device.

The present invention provides, in a first aspect thereof, an electro-optical display device including an electro-optical substance layer, first and second substrates sandwiching therebetween the electro-optical substance layer, a plurality of pixels defined on one of the first and second substrates, each of the pixels having an opening area for passing therethrough incident light and being associated with a shielded element near the opening area, and a shield film pattern mounted on one of the first and second substrates for shielding the shielded element, the first substrate including a substrate body having a first refractive index, and first through third insulation films lo overlying the transparent substrate body and arranged in this order as viewed from the electro-optical substance layer, the first and third insulation films having refractive indexes substantially equal to the first refractive index, the second insulation film having a refractive index higher than the first refractive index, the first insulation film having a flat top surface parallel to a surface of the substrate body, the first and second insulation films defining a first interface therebetween, the second and third insulation films defining a second interface therebetween, the first and second interfaces having respective slope portions inclined from the flat top surface in a vicinity of an edge of the opening area, the slope portions having respective inner and outer edges as viewed from the center of the opening area, the shielded element having an inner edge located apart from the outer edge of the slope portion of the first interface in the direction away from the opening area by a distance X expressed by:

$$X=(T1/\cos\beta)\times(\sin(\alpha-\beta)$$

where α and β are incidence angle and refracted angle, respectively, of the incident light at the first interface and T1 is a thickness of the second insulation film.

The present invention also provides, in a second aspect thereof, an electro-optical display device including an electro-optical substance layer, first and second substrates lo sandwiching therebetween the electro-optical substance layer, a plurality of pixels defined on one of the first and second substrates, each of the pixels having an opening area for passing therethrough incident light and being associated with a shielded element near the opening area, and a shield film pattern mounted on one of the first and second substrates for shielding the shielded element, the first substrate including a substrate body having a first refractive index, and a plurality of insulation films overlying the transparent substrate body, at least some of interfaces each defined by adjacent two of the insulation films having respective slope portions inclined from a surface of the first substrate within the opening area, wherein the adjacent two of the insulation films having an interface defining the slope portion have a substantially equal refractive index.

The present invention also provides, in a third aspect thereof, an image projection unit including an electro-optical display device according to the first or second aspect of the present invention.

In accordance with the electro-optical display device of the first aspect of the present invention, the incident light incident within the opening area of the pixel is effectively used for the pixel without being incident onto the shielded element, thereby improving the brightness of the electro-optical display device. In addition, since shielded element, such as the TFT, is not irradiated by the incident light, the shielded element does not cause any leakage current to thereby improve the contrast ratio of the electro-optical display device.

In a preferred configuration of the electro-optical display device of the first aspect, assuming that n1, n2 and n3 are refractive indexes of the first through third insulation films, respectively, the relationship n2>n1≧n3 should hold. If n1=n3, then the light incident onto the electro-optical display device in the direction normal to the surface of the first substrate can exit the electro-optical display device in the same direction. If n1>n3, then the direction of the light refracted on the slope portion of the second interface between the second insulation film and the third insulation film is directed nearer to the center of the pixel compared to the case of n1=n3.

In accordance with the electro-optical display device of the second aspect of the present invention, since the refractive indexes of the each two of the insulation films in the opening area which have interfaces therebetween not parallel to the first substrate are equivalent to one another, the light incident onto the slope portion travels in the same direction as the direction of the incident light without refraction. This suppresses the incidence of the light onto the shielded element such as TFT and interconnections, thereby improving the brightness and the contrast ratio of the electro-optical display device.

In accordance with the image projection unit of the present invention, the electro-optical display device of the present invention allows the image projection unit to achieve similar advantages.

The term "substantially equal refractive index" or "equivalent refractive index" of the films as used in this text means "a difference within 10%", for example, wherein the refraction at the interface between these films can be neglected in terms of the reduction of the brightness or contrast ratio of the electro-optical display device. Examples of the electro-optical substance in the electro-optical display device of the present invention include liquid crystal and electron powdery particles. It is preferable in the present invention that the interface between the films within the opening area have a smaller surface roughness, e.g., a surface roughness Ra of 0.05 μm or less.

BRIEF DESCRIPTION OF THE DRAWINGS

FIG. 1 is a sectional view of a transmission LCD device according to a first embodiment of the electro-optical display device of the present invention.

FIG. 2 is a detailed, schematic partial sectional view of the transmission LCD device of FIG. 1.

PREFERRED EMBODIMENT OF THE INVENTION

Figure 3A:
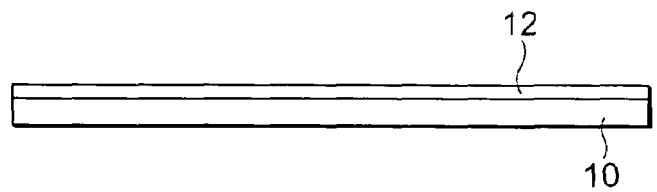
FIGS. 3A to 3Q are sectional views of the transmission LCD device of FIG. 1 in consecutive steps of fabrication thereof.

Now, the present invention is more specifically described with reference to accompanying drawings, wherein similar constituent elements are designated by similar reference numerals throughout the drawings.

Referring to FIG. 1, a transmission LCD device, generally designated by numeral 100, according to a first embodiment of the electro-optical display device of the present invention, includes a TFT substrate 1A and a counter substrate 1B sandwiching therebetween an LC layer 70. The TFT substrate 1A includes a glass substrate body 10, and a base layer 12 made of silicon oxide formed on the glass substrate body 10 and having a thickness of 0.06 to 0.03 µm. The base layer 12 has a function of preventing TFTs formed thereon from being stained by impurities diffused from the glass substrate body 10.

The TFTs formed on the base layer 12 each includes a polysilicon layer 16 acting as an active layer for the TFT, a gate electrode formed as a part of gate line 20, and a gate insulation film 18 formed between the polysilicon layer 16 and the gate line 20. The gate line 20 is made of WSi, Cr or Al, for example. The gate insulation film 18 is made of silicon oxide having a thickness of 0.1 µm. A portion of the gate insulation film 18 is configured to a slope, reflecting on the step difference formed between the base layer 12 and the polysilicon layer 16. The glass substrate body 10 and the gate insulation film 18 made of silicon oxide have an equivalent refractive index of around 1.45. Other silicon oxide films in the transmission LCD device 100 also have a refractive index of around 1.45.

On the gate insulation film 18 and the gate line 20, there is provided a first interlayer dielectric film 24 made of silicon oxide having a thickness of 0.4 µm. A potion of the first interlayer dielectric film 24 is configured to a slope, reflecting on the step difference between the flat surface of the gate insulation film 18 and the gate line 20. On the first interlayer dielectric film 24, there are provided source/drain lines 30 as shielded films and connected to the source/drain regions of the TFT via respective through holes penetrating the first interlayer dielectric film 24 and the gate insulation film 18. The edges of the source/drain lines 30 are configured to slopes similarly to the first interlayer dielectric film 24. A 0.4µm-thick second interlayer dielectric film 34 made of silicon oxide is formed on the source/drain lines 30 and the first interlayer dielectric film 24. A portion of the second interlayer dielectric film 34 is configured to a slope, reflecting on the step difference between the flat surface of the first interlayer dielectric film 24 and the source/drain lines 30.

On a portion of the second interlayer dielectric film 34, there is provided a bottom capacitor electrode 36 made of a Cr film having a specific shape. A capacitor insulation film 40 is formed on the second interlayer dielectric film 34 and the bottom capacitor electrode 36, and a shield film pattern 44 is formed on a portion of the capacitor insulation film 40 overlying the TFT. The shield film pattern 44 is made of Al connected to the source/drain electrode 30 and functions as the top capacitor electrode opposing the bottom capacitor electrode 36. A portion of the capacitor insulation film 40 overlying the slope of the second interlayer dielectric film 34 has a slope portion similarly to the second interlayer dielectric film 34.

On the capacitor insulation film 40 and the shield film pattern 44, there is provided a third interlayer dielectric film 48 made of silicon nitride having a thickness of 0.3 µm. A portion of the third interlayer dielectric film 48 overlying the slope of the capacitor insulation film 40 has a slope similarly to the capacitor insulation film 40. These slopes of the films configure a slope area 74 in the LCD device 100.

The refractive indexes of the capacitor insulation film 40 and the third interlayer dielectric film 48 are larger than the refractive indexes of the glass substrate body 10 and the silicon oxide films, and are approximately 1.95. The silicon nitride films configuring the other portions of the transmission LCD device 100 is also approximately 1.95. The combination of the capacitor insulation film 40 and the third interlayer dielectric film 48 constitutes a second insulation film in the present embodiment.

On the third interlayer dielectric film 48, there is provided an organic planarization film 52 having a top surface extending parallel to the surface of the glass substrate body 10. The organic planarization film 52 is made of acrylic resin having a thickness of around 1.2 µm. The organic acrylic resin has a refractive index of about 1.5 which is equivalent to the refractive indexes of the glass substrate body 10 and the silicon oxide film. The organic planarization film 52 constitutes the first insulation film in the present embodiment.

A through hole 56 penetrating the organic planarization film 52 and the third interlayer dielectric film 48 reaches the shield film pattern 44. A pixel electrode 60 made of ITO (indium-tin-oxide) is formed on the organic planarization film 52 and in the through hole 56 in each pixel. The pixel electrode 60 has a refractive index of about 1.95, which is equivalent to the refractive index of the silicon nitride.

The counter substrate 1B includes a glass substrate body 11, and a counter electrode 61 formed on the glass substrate body 11 in common to all the pixels. On each of the pixel electrode 60 on the TFT substrate 1A and the counter electrode 61 on the counter substrate 1B, there is provided an orientation film 64, and the liquid crystal layer 70 is sandwiched between both the orientation films 64 on the TFT substrate 1A and the counter substrate 1B to configure the LCD device 100.

The arrows shown in FIG. 1 denote the paths of a part of the light incident in the slope area 74 onto the interface 75 between the organic planarization film 52 and the third interlayer dielectric film 48 in the direction normal to the substrates 1A and 1B. This part of incident light in the slope area 74 is refracted at the interface 75 between the organic planarization film 52 and the third interlayer dielectric film 48 in the direction away from the opening area of the pixel because the third interlayer dielectric film 48 has a larger refractive index than the organic planarization film 52. Then, the part of incident light is refracted at the interface 76 between the capacitor insulation film 40 and the second interlayer dielectric film 34 toward the normal line of the substrates 1A and 1B, because the second interlayer dielectric film 34 has a refractive index larger than that of the capacitor insulation film 40 and equivalent to that of the organic planarization film 52. Thus, the light incident in the slope area 74 onto the interface 75 between the organic planarization film 52 and the third interlayer dielectric film 48 travels within the opening area of the pixel without irradiating the source/drain lines 30 and the TFT.

FIG. 2 illustrates detail of the behavior of the light incident in the slope area 74 onto the interface 75, while schematically depicting the portion of the TFT substrate 1A. In FIG. 2, the edge 30A of one of the source/drain lines 30, which is a shielded member, is located at a distance "X" apart from the outer edge 74A of the slope area 74 in the direction away from the opening area of the pixel. The distance "X" is expressed by the following formula:

$$X=(T1/\cos\beta)\times\sin(\alpha-\beta),$$

wherein T1 is the sum of the thicknesses of the capacitor insulation film 40 and the third interlayer dielectric film 48 in the slope area 74, and α and β are incidence angle and refracted angle of the incident light incident onto the interface 75 between the organic planarization film 52 and the third interlayer dielectric film 48 in the slope area 74. There is a relationship between the incidence angle α and the refracted angle β as follows:

$$\beta=\arcsin[(n1/n2)\times\sin\alpha],$$

wherein arcsin(n1/n2)<β<90°.

More specifically, the light emitted in the direction of normal line of the substrate from the light source is incident in the slope area 74 onto the interface 75 between the organic planarization film 52 and the third interlayer dielectric film 48, and then refracted twice at the interface 75 and at the interface 76, thereby travelling toward the glass substrate body 10 at the distance X apart from the incidence point of the light in the slope area 74 as viewed along the direction of the normal line.

In the configuration of the transmission LCD device of the present embodiment, the third interlayer dielectric film 48 and the capacitor insulation film 40 have a substantially equal refractive index, e.g. first refractive index, whereas the organic planarization film 52 and the second interlayer dielectric film 34 have a substantially equal refractive index, e.g., second refractive index. The first refractive index is larger than the second refractive index, and the edge 30A of the source/drain line 30 is located at a distance apart from the outer edge 74A of the slope area 74 in the direction away from the opening area. Thus, the light shifted by the distance X in the travelling location due to the twice refraction is not shielded by the source/drain line 30, whereby the effective opening ratio is not decreased and thus the transmission LCD device has a higher brightness.

Moreover, the reduction of the light irradiating the channel of the TFT reduces the leakage current of the TFT, thereby improving the contrast ratio of the transmission LCD device. Further, the silicon nitride configuring both the capacitor insulation film 40 and the third interlayer dielectric film 48 covers the substantially entire area of the TFT substrate 1A improves the reliability of operation of the TFT substrate 1A, and raises the data storage capability of the pixel due to an increased capacitance between the bottom capacitor electrode 36 and the shield film pattern 44 acting as a top capacitor electrode.

Figure 3B:
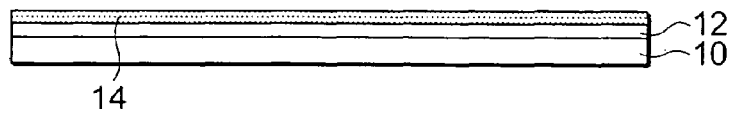
Figure 3C:
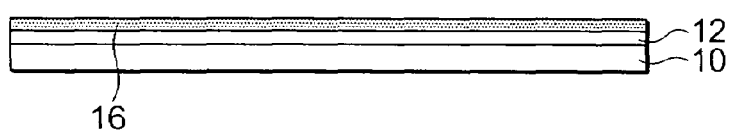
Figure 3D:
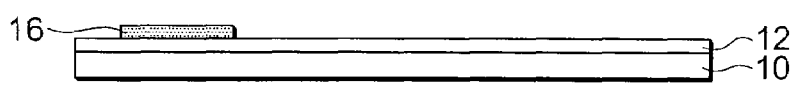
Figure 3E:
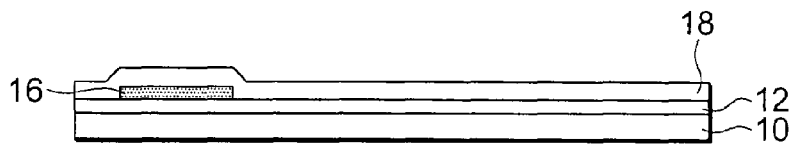
Figure 3F:
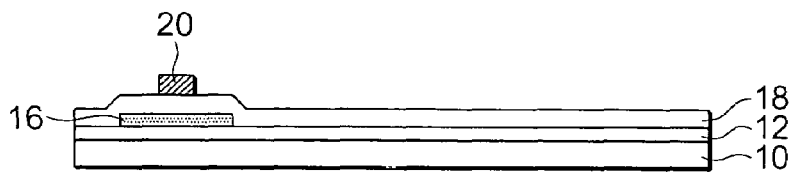
Figure 3G:
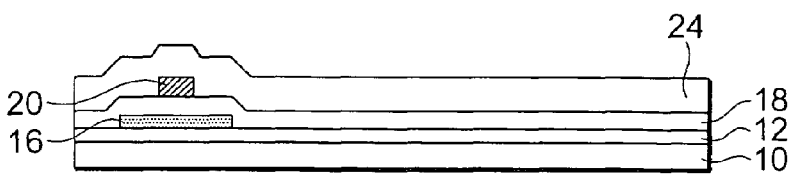
Figure 3H:
Figure 3I:
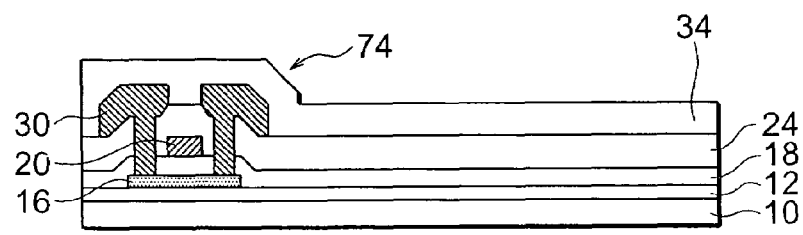
Figure 3J:
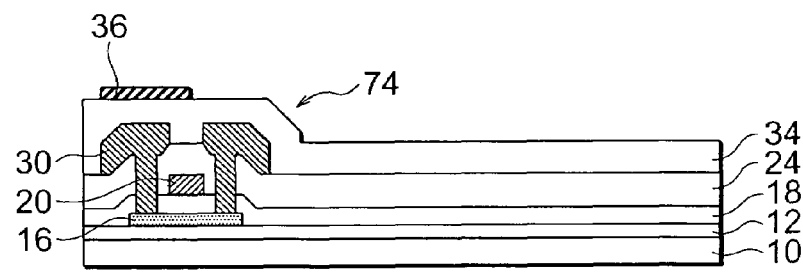
Figure 3K:
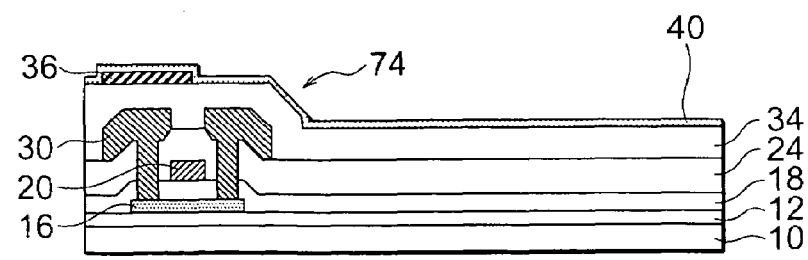
Figure 3L:
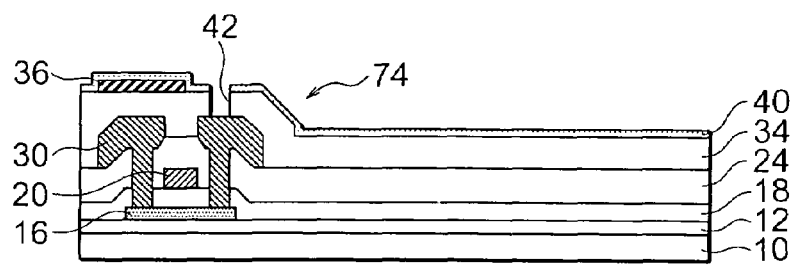
Figure 3M:
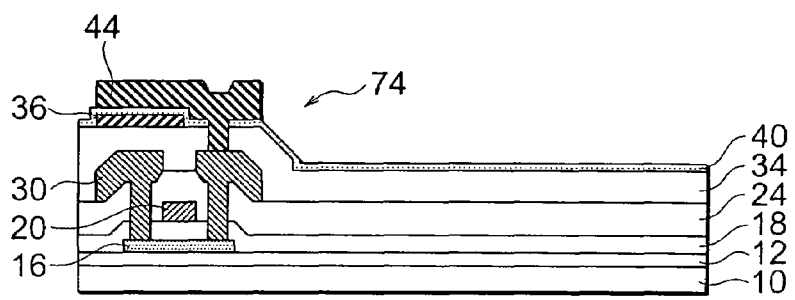
Figure 3N:
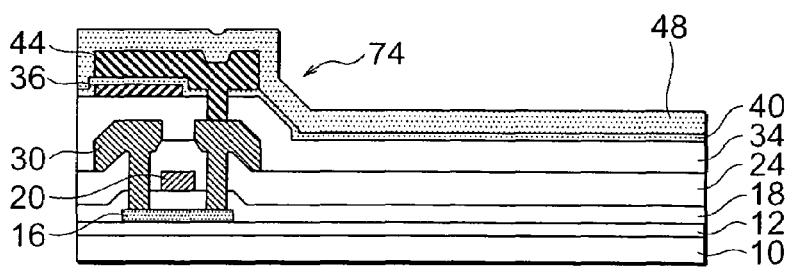
Figure 3O:
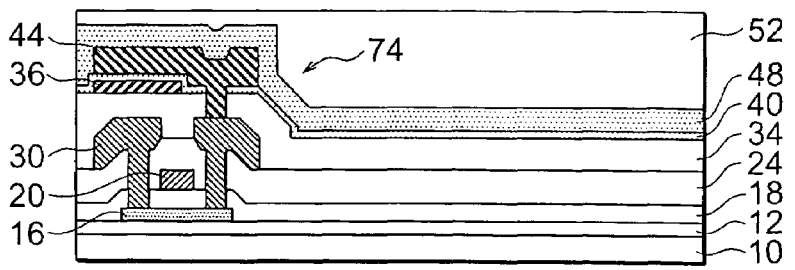
Figure 3P:
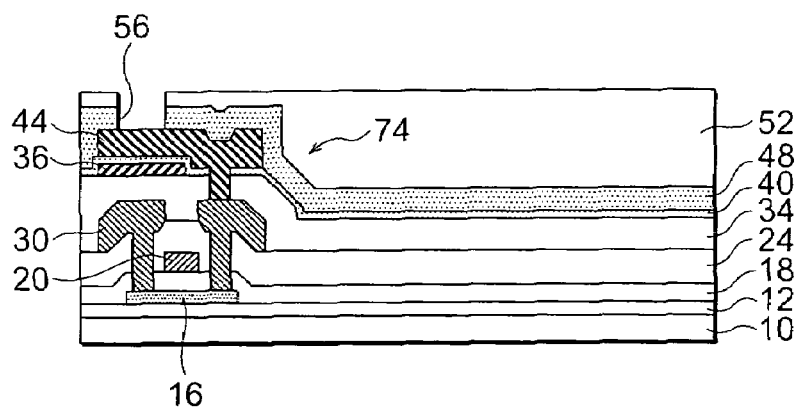
Figure 3Q:
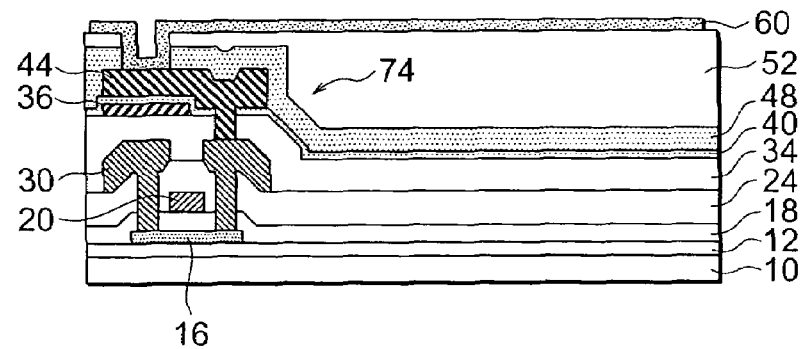

FIGS. 3A to 3Q consecutively show the fabrication steps of the transmission LCD device of FIG. 1. First, a base layer 12 made of silicon oxide is deposited using a CVD (chemical vapor deposition) technique on the glass substrate body 10 of the TFT substrate 1A, as shown in FIG. 3A. The refractive index of the silicon oxide is substantially equal to the refractive index of the glass substrate body 10, whereby the interface therebetween does not cause any reflection to suppress the reduction of the transmittance. The base layer 12 should have a thickness of 1 μm, for example, sufficient to prevent impurities in the glass substrate body 10, such as metals, from diffusing toward the TFT and degrading the properties of the TFT.

Subsequently, TFTs are formed on the base layer 12. To fabricate the TFT, as shown in FIG. 3B, an amorphous silicon film 14 is deposited on the base layer 12 to a thickness of 0.06 to 0.03 μm, followed by implanting dopants into the channel region of the TFT by using an ion-implantation technique.

Subsequently, a heat treatment using a laser annealing technique is conducted to convert the amorphous silicon film 14 into a polysilicon layer 16, as shown in FIG. 3C, followed by patterning the same using a photolithographic and etching technique to form a patterned polysilicon layer 16, as shown in FIG. 3D.

Thereafter, a gate insulation film 18 made of silicon oxide having a thickness of 0.1 μm is deposited using a CVD technique on the base layer 12 and the patterned polysilicon layer 16. The gate insulation film 18 has a slope portion reflecting on the step difference between the patterned polysilicon layer 16 and the underlying base layer 12. Subsequently, a metallic film such as WSi, Cr or Al film is deposited and patterned to form gate lines 20, as shown in FIG. 3F, thereby forming TFTs each including patterned polysilicon layer 16, gate insulation film 18 and gate line 20.

Substrates, as shown in FIG. 3G, a first interlayer dielectric film 24 made of silicon oxide having a thickness of 0.4 μm is deposited using a CVD technique. The first interlayer dielectric film 24 has a slope portion reflecting on the gate insulation film 18 and the overlying gate line 20 in each pixel. A photolithographic and etching step is conducted to the first interlayer dielectric film 24 and the gate insulation film 18 to form a through hole reaching the patterned polysilicon layer 16, followed by sputtering thereon Al to form an Al film on the first interlayer dielectric film 24 and in the through hole. Subsequently, the Al film is patterned to form source/drain lines 30, as shown in FIG. 3H, wherein the source/drain line 30 is designed, as shown in FIG. 2, to have an edge 30A located at a distance X=(T1/cos β)×sin(α−β) apart from the outer edge 74A of the slope area 74 in the direction away from the opening area of each pixel. The edges of the source/drain lines 30 have slope portions similar to the slope portion of the first interlayer dielectric film 24.

Thereafter, as shown in FIG. 3I, a second interlayer dielectric film 34 made of silicon oxide having a thickness of 0.4 μm is deposited on the first interlayer dielectric film 24 and the source/drain lines 30. The second interlayer dielectric film 34 has a slope portion similar to the slope portion of the source/drain line 30 in each pixel.

Subsequently, as shown in FIG. 3J, a Cr film is deposited by sputtering onto the second interlayer dielectric film 34 and patterned to configure a 0.2-μm-thick bottom capacitor electrode 36. Thereafter, as shown in FIG. 3K, a capacitor insulation film 40 made of silicon nitride having a thickness of 0.2 μm is deposited. The capacitor insulation film 40 has a slope portion reflecting on the slope portion of the second interlayer dielectric film 34.

Thereafter, as shown in FIG. 3L, a photolithographic and etching process is conducted to the capacitor insulation film 40 and the second interlayer dielectric film 34 to form through holes reaching the source/drain lines 30. An Al film having a thickness of 0.2 μm is then deposited by sputtering onto the first interlayer dielectric film 24 and the source/drain lines 30, and patterned to configure a shield film pattern 44, as shown in FIG. 3M.

Thereafter, as shown in FIG. 3N, a third interlayer dielectric film 48 made of silicon nitride having a thickness of 0.4 μm is deposited on the shield film pattern 44 and the capacitor insulation film 40. The third interlayer dielectric film 48 has a slope portion reflecting on the slope portion of the capacitor insulation film 40.

Subsequently, as shown in FIG. 3O, an organic planarization film 52 having a thickness of around 1.2 μm is formed by coating on the third interlayer dielectric film 48. The organic planarization film 52 has a flat top surface unlike the underlying layers. Thereafter, as shown in FIG. 3P, a through hole 56 is formed in the planarization film 52 and the third interlayer dielectric film 48 to reach the shield film pattern 44. Thereafter, as shown in FIG. 3Q, an ITO film is formed by sputtering onto the organic planarization film 52 and in the through hole 56, followed by patterning thereof and forming each pixel electrode 60 thereon to complete the TFT substrate 1A.

On the other hand, another glass substrate 11 is prepared, and a counter electrode 61 is formed thereon to complete the counter substrate 1B. Both the TFT substrate 1A and the counter substrate 1B are then covered with respective orientation films 64, and are assembled to oppose each other by bonding. Liquid crystal is then injected through an injection port to form an LC layer sandwiched between the TFT substrate 1A and the counter substrate 1B, thereby achieving the LCD device of FIG. 1.

Figure 11:
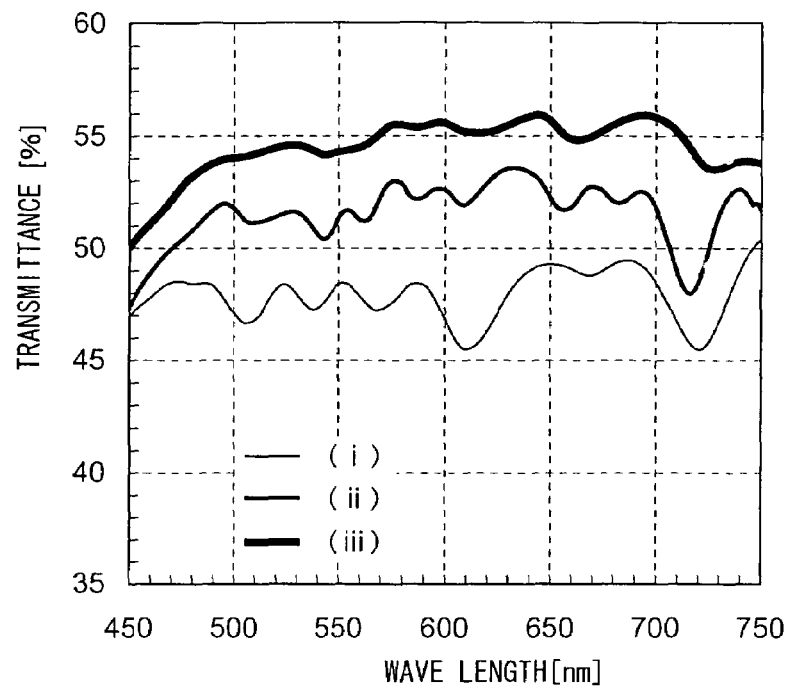
FIG. 11 is a diagram showing transmittance profiles lo wherein the transmittance is plotted against the wavelength of the light.
Figure 14:
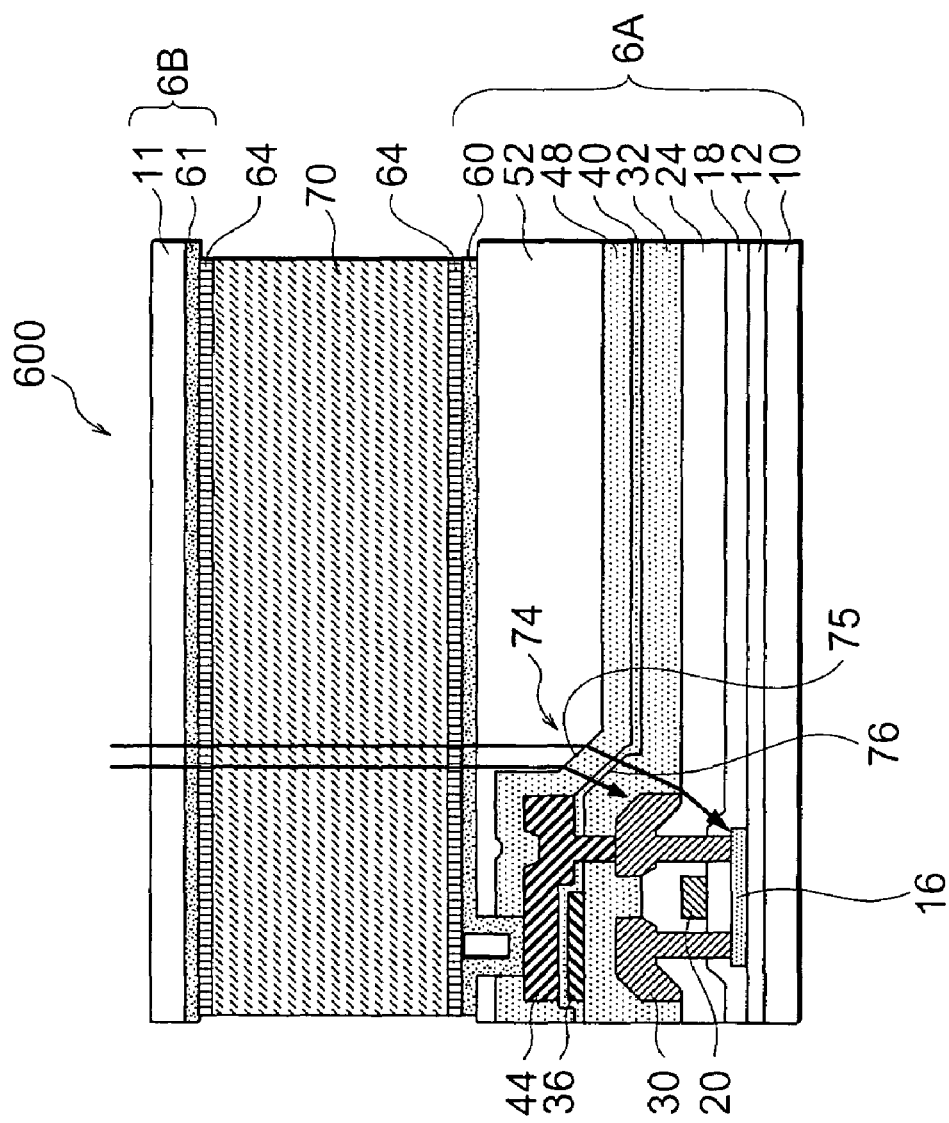
FIG. 14 is a sectional view of a conventional transmission LCD device.

The transmittance of the LCD device of the present embodiment is evaluated and compared to the transmittance of the conventional LCD device. FIG. 11 shows the results of the evaluation of the transmittance. The conventional LCD device used herein is depicted in FIG. 14, and is similar to the LCD device of the present embodiment shown in FIG. 1 except that the second interlayer dielectric film 34 in FIG. 1 is replaced by a silicon nitride film in the conventional LCD device in FIG. 14. The graph (i) in FIG. 11 shows the transmittance of the conventional LCD device, whereas the graph (ii) shows the transmittance of the LCD device of the present embodiment.

As understood from FIG. 11, at a wavelength of 600 nm, for example, the transmittance of the LCD device of the present embodiment is improved by about 6% compared to the transmittance of the conventional LCD device. More generally, in the whole wavelength range between 450 nm and 750 nm, the transmittance of the LCD device of the present embodiment is superior to the transmittance of the conventional LCD device. That is, the LCD device of the present embodiment is superior to the conventional LCD device in the transmittance characteristic.

Figure 4:
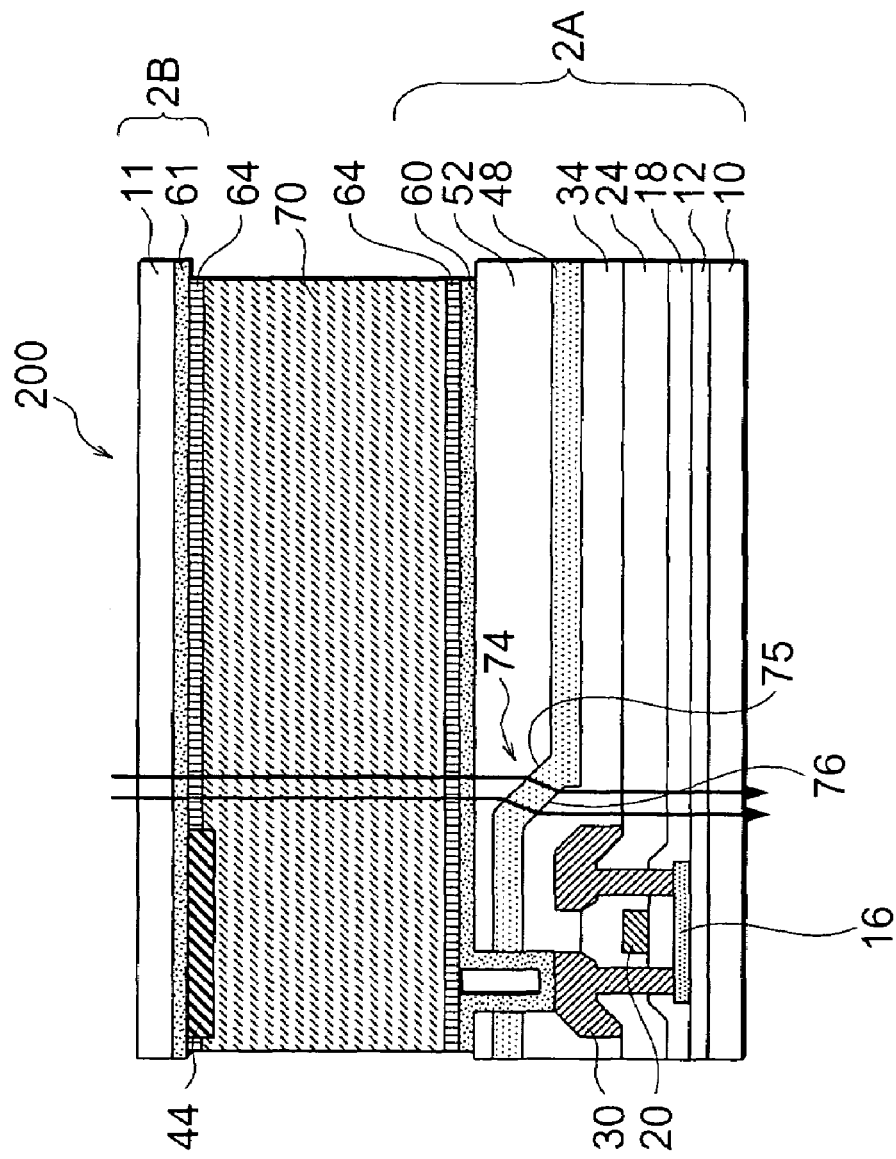
FIG. 4 is a sectional view of a transmission LCD device according to a second embodiment of the electro-optical display device of the present invention.

Referring to FIG. 4, a transmission LCD device, generally designated by numeral 200, according to a second embodiment of the present invention is similar to the LCD device of FIG. 1 except for the layered structure. More specifically, in the LCD device of the present embodiment, the capacitor shown in FIG. 1 is not formed, and the third interlayer dielectric film 48 is formed directly on the second interlayer dielectric film 34. A through hole is formed penetrating the organic planarization film 52, the third interlayer dielectric film 48 and the second interlayer dielectric film 34 to reach the source/drain line 30. The pixel electrode 60 is formed on the organic planarization film 52 and in the through hole.

In the counter substrate 1B, a shield film pattern 44 is formed to shield the TFT area in the TFT substrate 1A, replacing a portion of the orientation film 64. Other configurations of the LCD device 200 are similar to those of the LCD device 100 of FIG. 1.

Figure 5J:
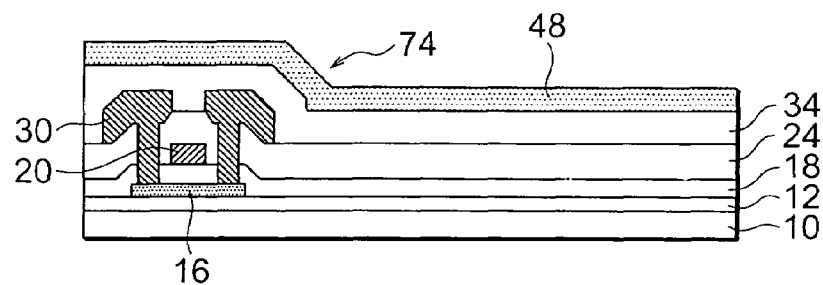
FIGS. 5J to 5M are sectional views of the TFT substrate in the transmission LCD device of FIG. 4 in consecutive steps of fabrication thereof.
Figure 5K:
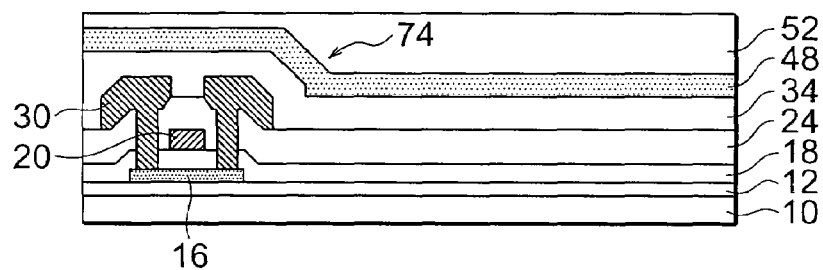

FIGS. 5J to 5M show fabrication steps for the LCD device 200 of FIG. 4. The LCD device 200 is manufactured in the step similar to the steps 3A to 3I before the step 5J, and thus description of the detailed steps before the step 5J is omitted here for avoidance of duplication. After forming a second interlayer dielectric film 34, as shown in FIG. 5J, a third interlayer dielectric film 48 made of silicon nitride is deposited thereon to a thickness of 0.4 µm. The third interlayer dielectric film 48 has a slope portion reflecting on the slope portion of the second interlayer dielectric film 34 in the slope area 74. Subsequently, as shown in FIG. 5K, an organic planarization film 52 is formed by coating on the third interlayer dielectric film 48. The organic planarization film 52 is about 1.2 µm thick and has a flat top surface.

Figure 5L:
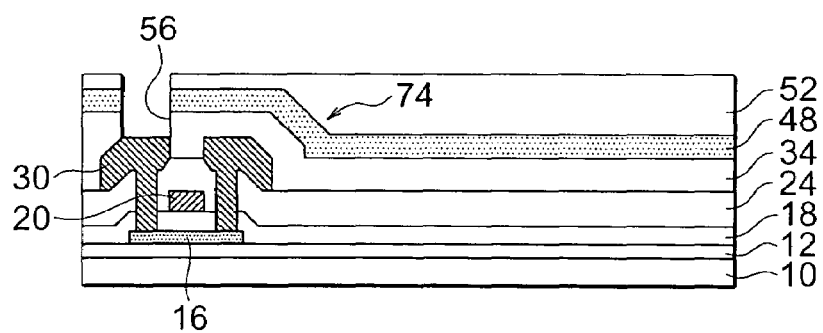
Figure 5M:
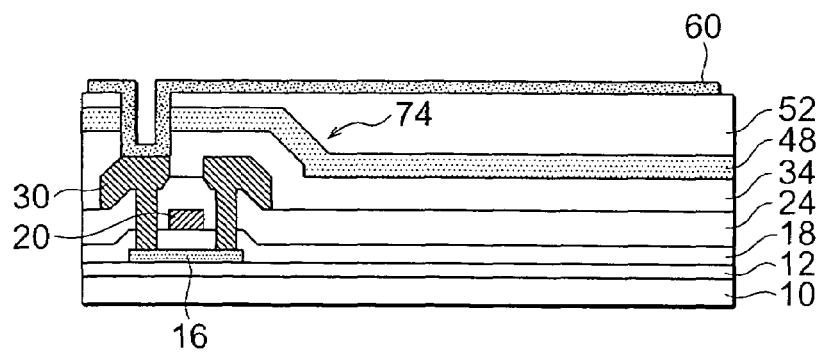

Thereafter, as shown in FIG. 5L, a through hole 56 is formed penetrating the organic planarization film 52, third interlayer dielectric film 48 and second interlayer dielectric film 34 to reach the source/drain line 30. Subsequently, as shown in FIG. 5M, an ITO film is formed on the organic planarization film 52 and in the through hole 56 by sputtering and patterned to form pixel electrodes 60, to obtain a TFT substrate 2A. The TFT substrate 2A is then covered with an orientation film.

On the other hand, another glass substrate body 11 is prepared, and a counter electrode 61 is formed thereon to obtain a counter substrate 2B. The counter substrate 2B is then covered with an orientation film 64 and a shield film pattern 44. Both the TFT substrate 2A and the counter substrate 2B are assembled to oppose each other and bonded together. Then, liquid crystal is injected between the TFT substrate 2A and the counter substrate 2b through an injection port, to obtain the transmission LCD device of FIG. 4.

The transmission LCD device of the present embodiment has advantages similar to the advantages of the LCD device of the first embodiment, and in addition thereto, an advantage that the number of the fabrication steps is reduced due to the structure wherein the shield film pattern 44 is formed on the counter substrate 2B.

Figure 6:
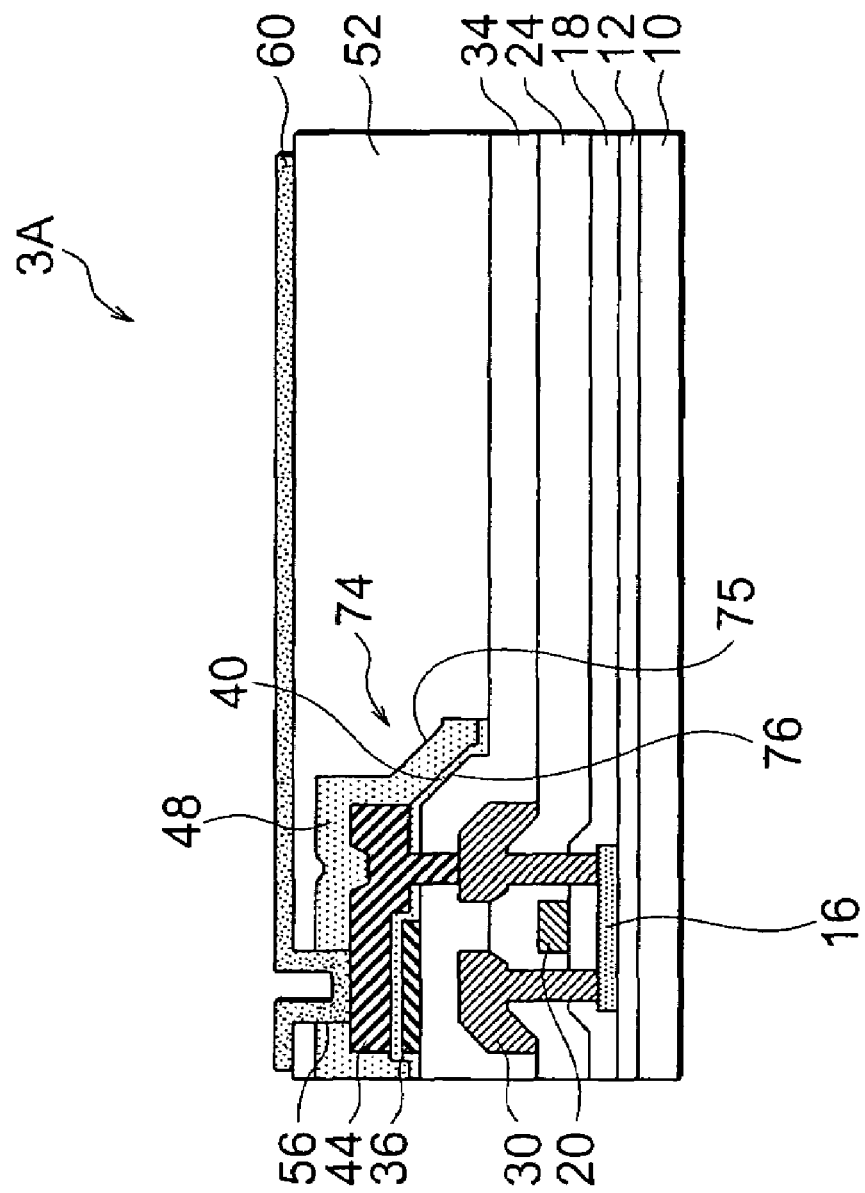
FIG. 6 is a sectional view of a TFT substrate in a transmission LCD device according to a third embodiment of the electro-optical display device of the present invention.

Referring to FIG. 6, a TFT substrate 3A of a transmission LCD device according to a third embodiment of the present invention is such that portions of the third interlayer dielectric film 48 and the capacitor insulation film 40 located within the opening area, or inner side of the slope area 74, are removed by etching. On the portion of the second interlayer dielectric film 34 exposed by the removal of the third interlayer dielectric film 48 and on the remaining portion of the third interlayer dielectric film 48, there is provided an organic planarization film 52 made of silicone resin. The organic planarization film 52 has a flat top surface parallel to the surface of the glass substrate body 10. The organic planarization film 52 has a refractive index of about 1.4 to 1.5, which is equivalent to the refractive index of the glass substrate body 10 and the silicon oxide. A through hole 56 is formed penetrating the organic planarization film 52 and the third interlayer dielectric film 48 to reach the shield film pattern 44. Each pixel electrode 60 patterned from an ITO film is provided on the organic planarization film 52 and in the through hole 56.

Figure 7O:
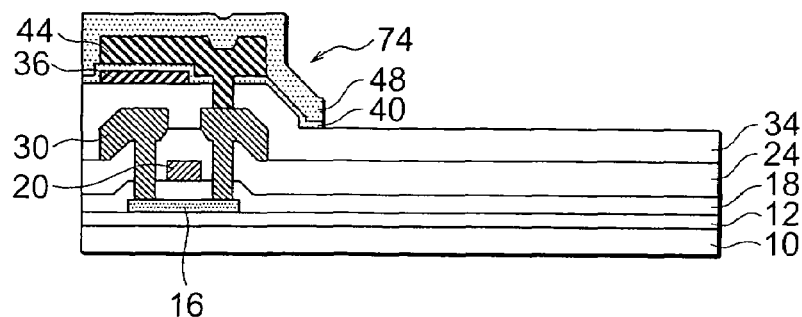
FIGS. 7O to 7Q are sectional view of the TFT substrate of FIG. 6 in consecutive steps of fabrication thereof.
Figure 7P:
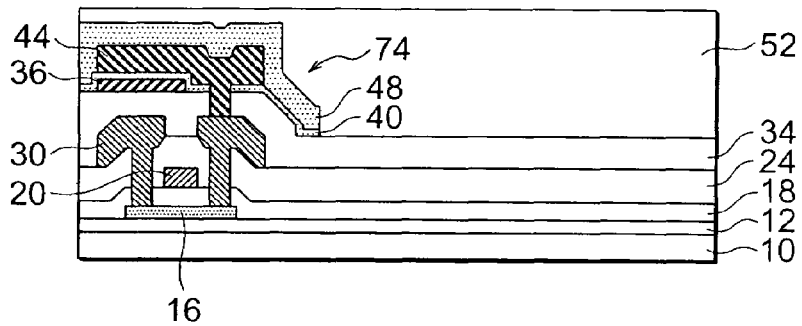
Figure 7Q:
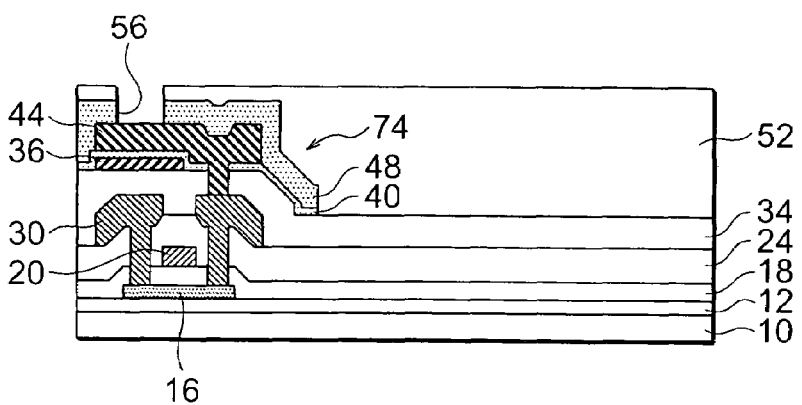

FIGS. 7O to 7Q show fabrication steps of the TFT substrate 3A of the transmission LCD device of the third embodiment. The TFT substrate 3A is manufactured in steps similar to the steps 3A to 3N before the step 7O, and thus detailed description of the steps before the step 7O for the present embodiment is omitted herein for avoidance of duplication.

After depositing a third interlayer dielectric film 48, as shown in FIG. 7O, most of the portions of the third interlayer dielectric film 48 and the capacitor insulation film 40 within the opening area, e.g., portions inside to the inner edge of the slope area 74 are removed by etching. Subsequently, as shown in FIG. 7P, an organic planarization film 52 is formed thereon having a flat top surface.

Thereafter, as shown in FIG. 7Q, a through hole 56 is formed penetrating the organic planarization film 52 and the third interlayer dielectric film 48 to reach the shield film pattern 44. Subsequently, ITO film is deposited on the organic planarization film 52 and in the through hole 56 and patterned to form each pixel electrode 60, to obtain the TFT substrate 3A. Other steps are similar to the steps described in connection with the first embodiment.

The TFT substrate 3A in the present embodiment has a structure wherein the organic planarization film 52 and the second interlayer dielectric film 34 define an interface therebetween. This allows the layered structure including the bottom glass substrate body 10 to the organic planarization film 52 has a refractive index of about 1.45 at any depth of the layered structure. More specifically, in the opening area of the pixel, there is no interface having different refractive indexes between the two films forming the interface.

The layered structure in the third embodiment suppresses reduction of the transmittance by reducing the transmission loss of the light passing within the opening area. The remaining portions of the capacitor insulation film 40 and the third interlayer dielectric film 48 within the opening area, i.e., inside of the slope area 74 allows the shield film pattern 44 and the bottom capacitor electrode 36 to have a higher capacitance therebetween, achieving a higher charge storage capability. It is to be noted that, although most of the portions of the capacitor insulation film 40 and the third interlayer dielectric film 48 within the opening area are removed in the present embodiment, all of those portions within the opening area or some of those portions within the opening area may be removed instead.

In FIG. 11, graph (iii) shows the transmittance of the transmission LCD device of the present embodiment. As understood from these graphs, the transmission LCD device of the present embodiment achieves an about 9% improvement over the conventional LCD device and an about 3% improvement over the LCD device of the first embodiment. In addition, the LCD device of the present embodiment has transmittance superior to those of the conventional LCD device 100 and the LCD device 600 of the first embodiment in the whole wavelength region between 450 nm and 750 nm.

Figure 8:
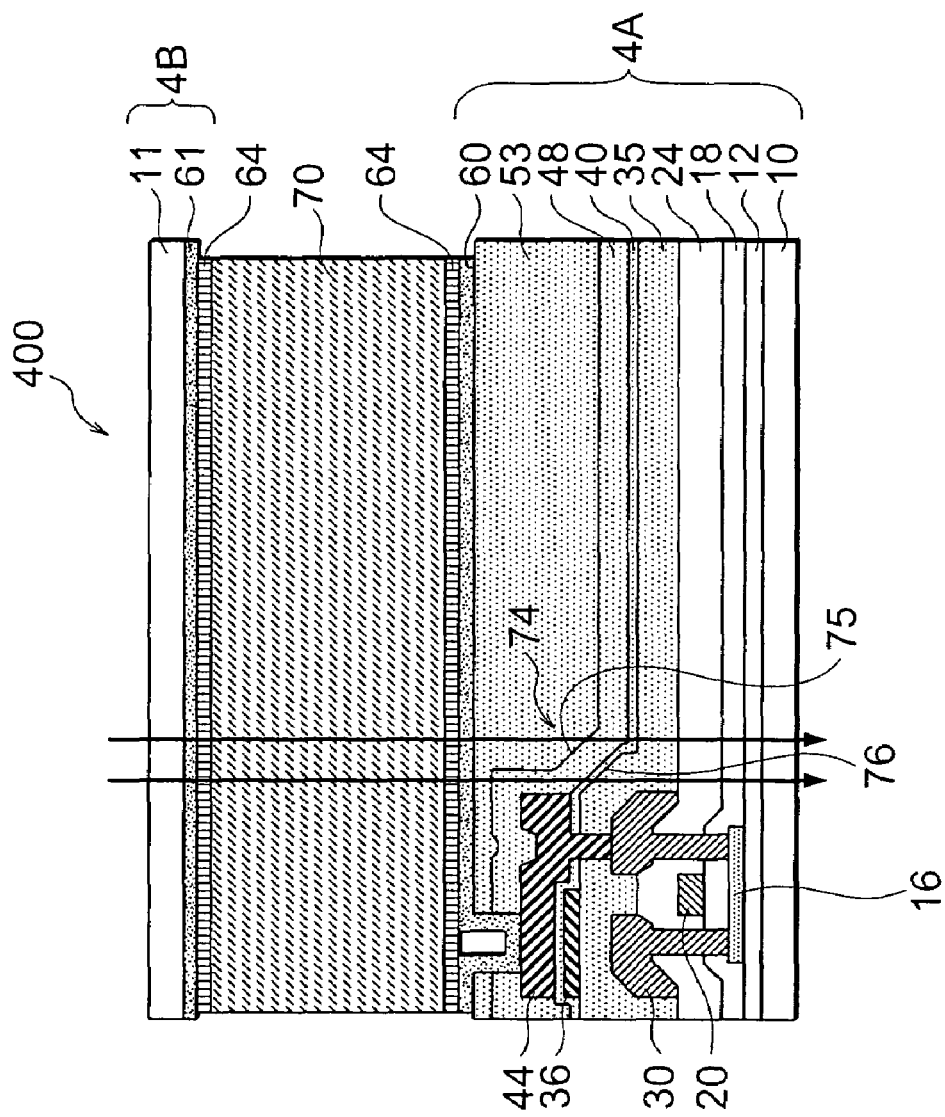
FIG. 8 is a sectional view of a transmission LCD device according to a fourth embodiment of the electro-optical display device of the present invention.

Referring to FIG. 8, a transmission LCD device, generally designated by numeral 400, according to a fourth embodiment of the present invention is similar to the LCD device 100 of the first embodiment except that the second interlayer dielectric film 35 is made of silicon nitride and the organic planarization film 53 is made of polysilane resin in the present embodiment. The silicon nitride and the polysilane resin have a substantially equal refractive index of about 1.95, which is larger than the refractive indexes of the glass substrate body 10 and the silicon oxide.

In the transmission LCD device 400 of the present embodiment, the portion of the light incident in the slope area 74 is not refracted at any interface in the slope area 74, as depicted by arrows in FIG. 8. More specifically, part of the light incident within the opening area in the direction normal to the surface of the counter substrate 4B passes through the TFT substrate 4A without refraction thereof, thereby achieving a higher transmittance of the LCD device.

Although the organic planarization film 53 is made of polysilane resin in the present embodiment, the planarization film 53 may be a silicon nitride film having a flat surface polished using a CMP (chemical-mechanical polishing) technique. In such a case, the layered structure has a refractive index of about 1.95 at any depth of the layered structure within the opening area.

Figure 9:
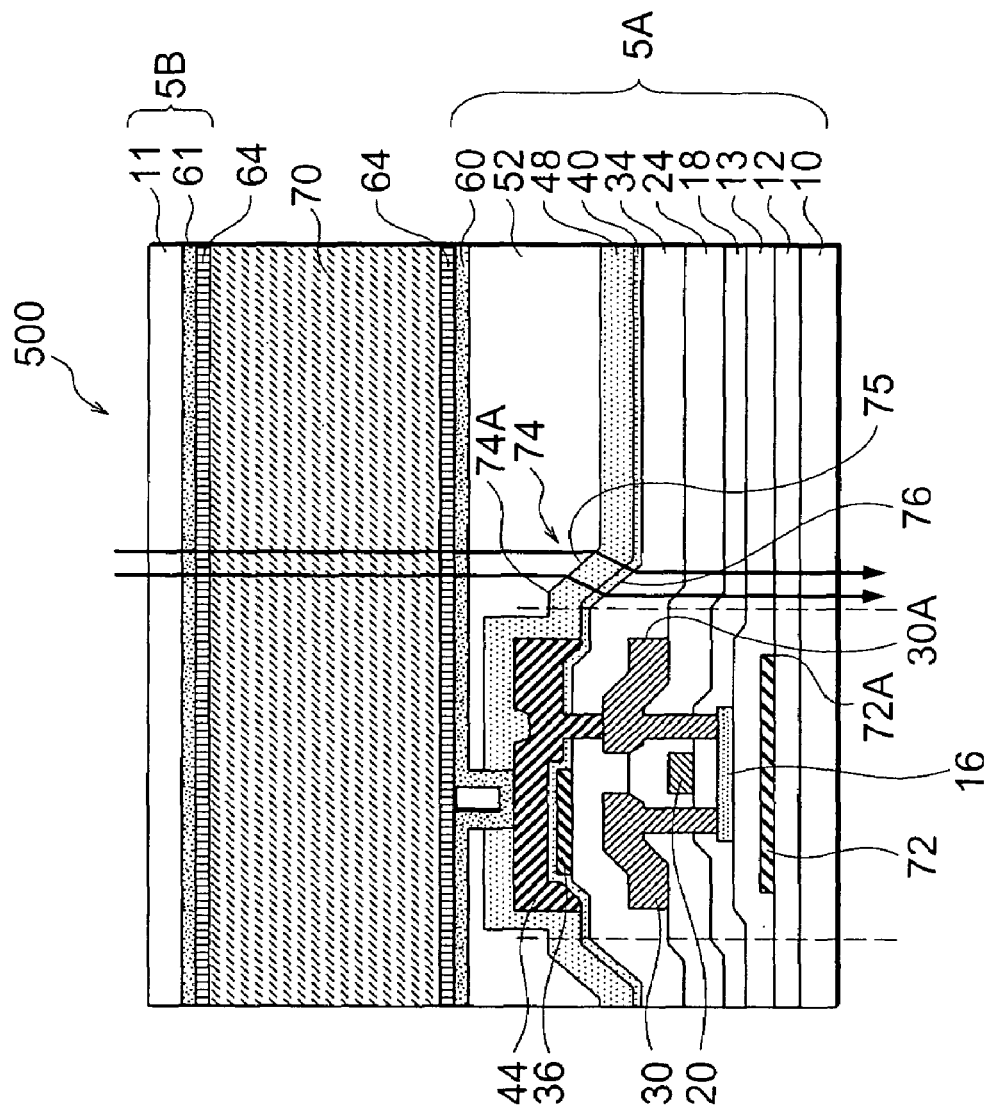
FIG. 9 is a sectional view of a transmission LCD device according to a fifth embodiment of the electro-optical display device of the present invention.

Referring to FIG. 9, a transmission LCD device, generally designated by numeral 500, according to a fifth embodiment of the present invention has a layered structure wherein a bottom shield film pattern 72 is additionally provided on the base layer 12 made of silicon oxide, and the polysilicon layer 16 is disposed on another base film 13 formed on the base layer 12 to overlie the bottom shield film pattern 72.

In the TFT substrate 5A, the inner edge 30A of the source/drain line 30 and the inner edge 72A of the bottom shield film pattern 72 are located at a distance X=(T1/cos β)×(sin(α−β)) apart from the outer edge 74A of the slope area 74 in the direction away from the opening area of the pixel. The dotted line in FIG. 9 denotes the outer edge of the slope of the interface 76 between the second interlayer dielectric film 34 and the capacitor insulation film 40. As depicted by arrows in the drawing, the part of light incident onto the interface 75 between the organic planarization film 52 and the third interlayer dielectric film 48 is refracted at the interface 75 in the direction away from the opening area of the pixel, and then refracted at the interface 76 between the capacitor insulation film 40 and the second interlayer dielectric film 34 toward the normal line of the TFT substrate 5A. Thus, the part of light is not incident onto the source/drain lines 30 and the bottom shield film pattern 72. The other configurations of the LCD device 500 of the present embodiment are similar to those of the LCD device 100 of the first embodiment. In the present embodiment, the source/drain lines 30 and the bottom shield film pattern 72 are shielded element in the present embodiment.

A transmission LCD device for use in a projection unit, for example, includes a light source emitting light having an extremely high intensity. In this LCD device, the light once passed by the LCD device returns to the LCD device by the optical system in the projection unit at the rear side of the LCD device. The returned light has also a high intensity. The returned light may irradiate the channel of the TFT to generate a leakage current, whereby the contrast ratio of the LCD device may be reduced. The bottom shield film pattern 72 in the present embodiment suppress the incidence of the returned light onto the channel of the TFT, thereby preventing reduction of the contrast ratio.

Figure 10:
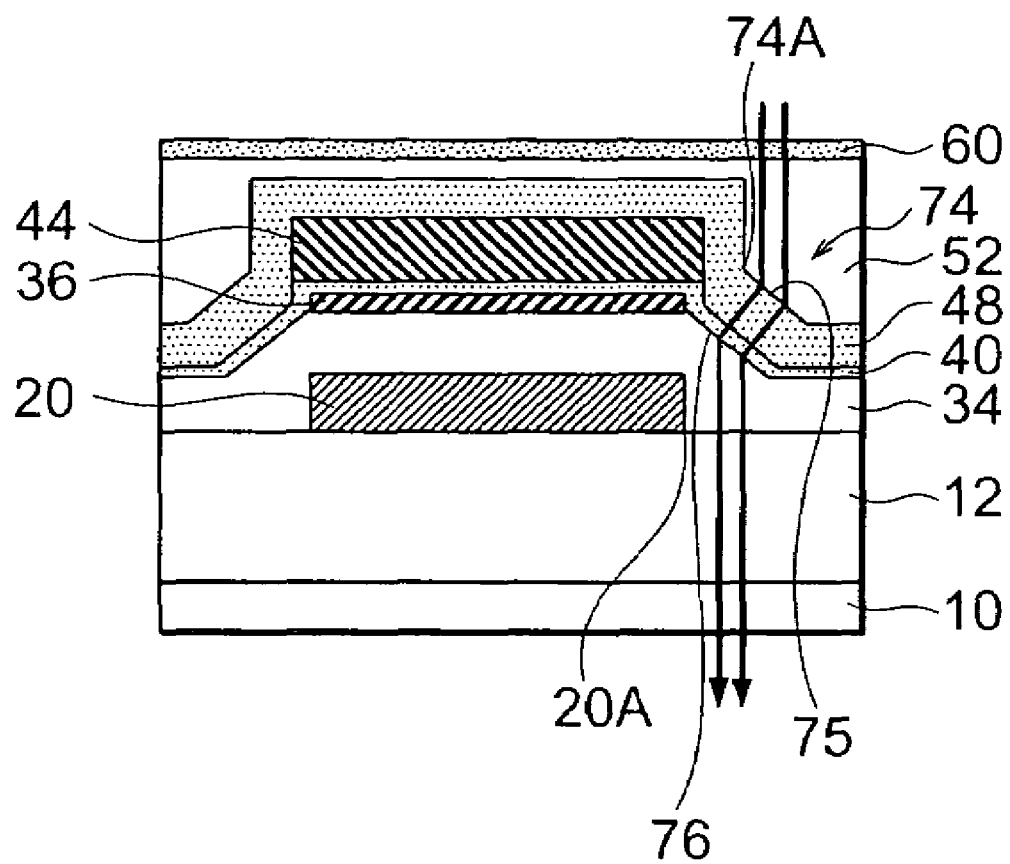
FIG. 10 is a sectional view taken in the area where TFT is not provided in each of the transmission LCD devices according to the first through fifth embodiments.

FIG. 10 shows a vicinity of the gate line 20 outside the TFT area in each of the LCD devices of the above embodiments. The edge 20A of the gate line 20 which constitutes a shielded element is located at a distance X=(T1/cos β)×(sin(α−β)) apart from the outer edge 74A of the slope area 74 in the direction away from the opening area of the pixel. As illustrated by the arrows in the drawing, the part of light incident in the slope area 74 onto the interface 75 between the organic planarization film 52 and the third interlayer dielectric film 48 is refracted in the direction away from the opening area, and then refracted at the interface 76 between the capacitor insulation film 40 and the second interlayer dielectric film 34, whereby the part of light is not shielded by the gate line 20.

Figure 12:
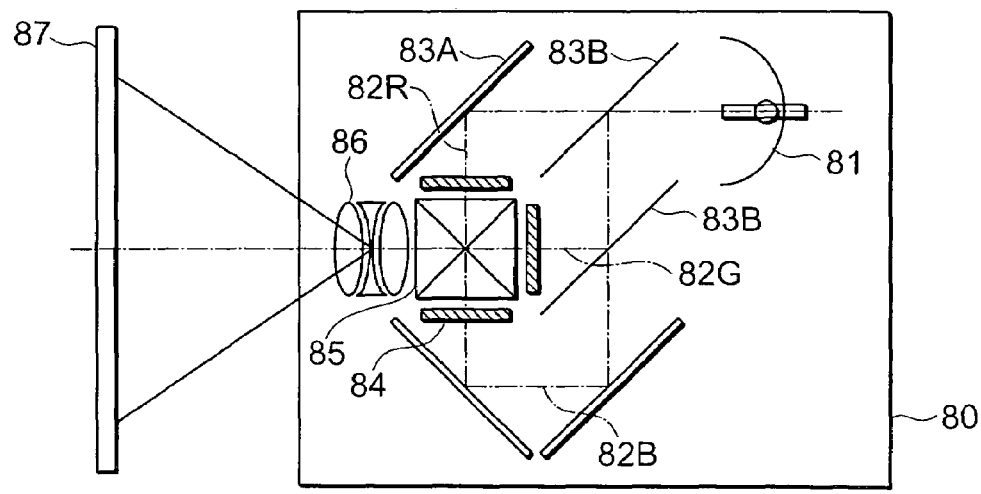
FIG. 12 is a schematic sectional view of an image projection unit according to an embodiment of the present invention.

Referring to FIG. 12, an LCD projection unit, generally designated by numeral 80, according to an embodiment of the present invention includes three transmission LCD devices 84 as light valves of the projection unit 80.

More specifically, the LCD projection unit 80 includes a halogen lamp 81 as a light source, a color separator system for separating the light emitted from the halogen lamp 81 into three primary color fluxes including red, green and blue light fluxes 82R, 82G and 82B, and three light vales 84 as mentioned above, a color synthesis system for synthesizing the three color fluxes after passing through the three light valves 84, and a projection optical system including a projection lens 86 for achieving an extended projection of the image. The color separator system includes a mirror 83A, dichroic mirror 83B etc., whereas the color synthesis system includes a dichroic prism 85 etc. Each of the light valves 84 is one of the transmission LCD devices of the first through fifth embodiments.

Figure 13:
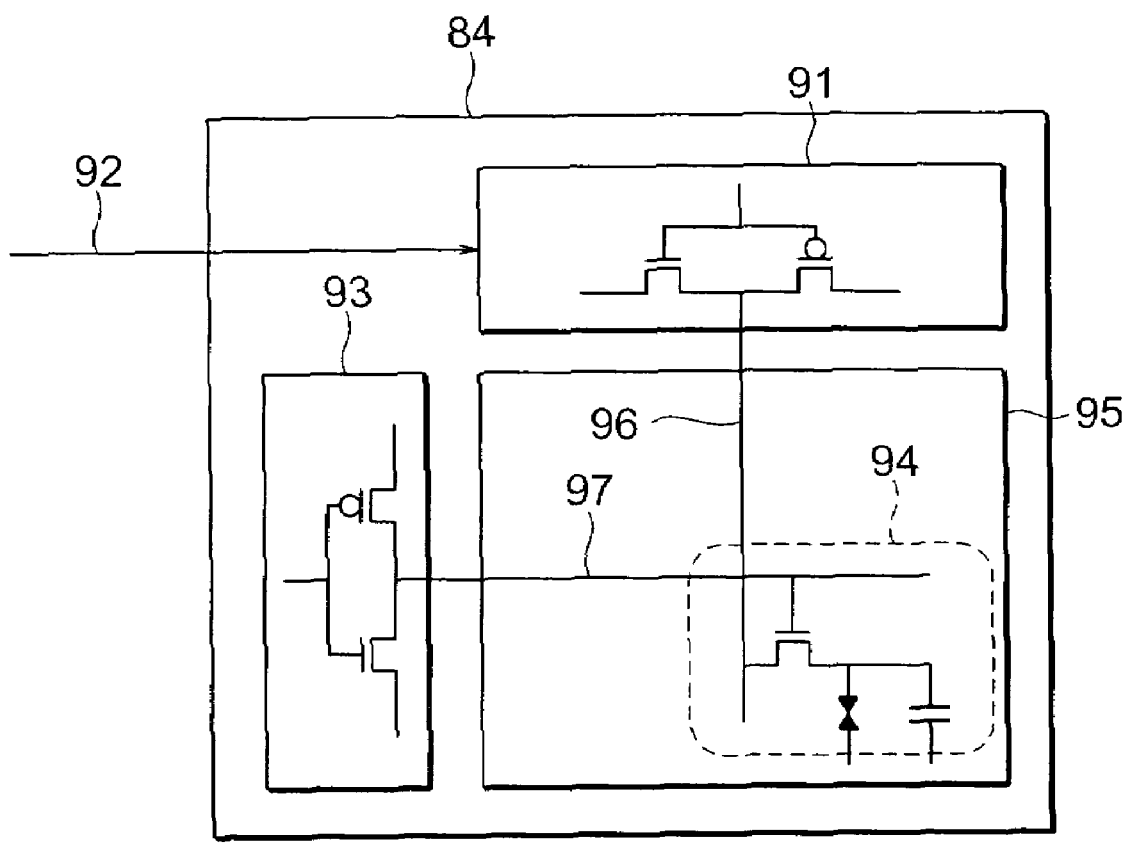
FIG. 13 is a schematic diagram showing a pixel and a drive circuit in the light valve shown in FIG. 12.

FIG. 13 shows a schematic diagram showing one of the pixels and a corresponding part of the drive circuit in the light valve 84 in the present embodiment. The light valve 84 includes a data driver 91 for receiving image data through a data input line 92 to output a data signal through each data line 96 extending in the column direction of the pixel area of the LCD device, a gate driver 93 for driving gate lines 97 extending in the row direction of the pixel area, an array of pixels 95 disposed in the pixel area and each including a TFT 94 and a pixel electrode. The TFT 94 receives a data signal through the data line 96 and a gate drive signal through the gate line 97 for driving the pixel electrode.

The electro-optical display device of the present invention can be used as a light valve of an image projection unit such as front-panel data projector, front-panel home projector and rear-panel projector.

Since the above embodiments are described only for examples, the present invention is not limited to the above embodiments and various modifications or alterations can be easily made therefrom by those skilled in the art without departing from the scope of the present invention.

What is claimed is:

1. An electro-optical display device comprising an electro-optical substance layer, first and second substrates sandwiching therebetween said electro-optical substance layer, a plurality of pixels defined on one of said first and second substrates, each of said pixels having an opening area for passing therethrough incident light and being associated with a shielded element near said opening area, and a shield film pattern mounted on one of said first and second substrates for shielding said shielded element, said first substrate including a substrate body having a first refractive index, and first through third insulation films overlying said transparent substrate body and arranged in this order as viewed from said electro-optical substance layer, said first and third insulation films having refractive indexes substantially equal to said first refractive index, said second insulation film having a refractive index higher than said first refractive index, said first insulation film having a flat top surface parallel to a surface of said substrate body, said first and second insulation films defining a first interface therebetween, said second and third insulation films defining a second interface therebetween, said first and second interfaces having respective slope portions inclined from said flat top surface and disposed within said opening area, said slope portions having respective inner and outer edges as viewed from the center of the opening area, said shielded element having an inner edge located apart from said outer edge of said slope portion of said first interface in the direction away from said opening area by a distance X expressed by:

$X=(T1/\cos \beta) \times (\sin(\alpha-\beta))$ where $\alpha$ and $\beta$ are incidence angle and refracted angle, respectively, of the incident light at said first interface and T1 is a thickness of said second insulation film.

2. The electro-optical display device according to claim 1, wherein said first through third insulation films having refractive indexes of n1, n2 and n3, respectively, satisfying the following relationship:

$n2 > n1 \geq n3$.

3. The electro-optical display device according to claim 1, wherein a portion of said second insulation film located within said opening area is removed within the inner side of said slope portion of said first interface.

4. The electro-optical display device according to claim 1, wherein said electro-optical display device is a transmission liquid crystal display device.

5. The electro-optical display device according to claim 1, wherein said first, second and third interfaces each have respective slope portions that are inclined from said flat top surface at a same angle in the vicinity of the edge of said opening area.

6. An image projection unit comprising a light source, an electro-optical display device, and an optical transmission system for projecting light emitted from light source onto a screen after passing the light through said electro-optical display device, said electro-optical display device comprising an electro-optical substance layer, first and second substrates sandwiching therebetween said electro-optical substance layer, a plurality of pixels defined on one of said first and second substrates, each of said pixels having an opening area for passing therethrough incident light and being associated with a shielded element near said opening area, and a shield film pattern mounted on one of said first and second substrates for shielding said shielded element, said first substrate including a substrate body having a first refractive index, and first through third insulation films overlying said transparent substrate body and arranged in this order as viewed from said electro-optical substance layer, said first and third insulation films having refractive indexes substantially equal to said first refractive index, said second insulation film having a refractive index higher than said first refractive index, said first insulation film having a flat top surface parallel to a surface of said substrate body, said first and second insulation films defining a first interface therebetween, said second and third insulation films defining a second interface therebetween, said first and second interfaces having respective slope portions inclined from said flat top surface and disposed within said opening area, said slope portions having respective inner and outer edges as viewed from the center of the opening area, said shielded element having an inner edge located apart from said outer edge of said slope portion of said first interface in the direction away from said opening area by a distance X expressed by:

$X=(T1/\cos \beta) \times (\sin(\alpha-\beta))$ where $\alpha$ and $\beta$ are incidence angle and refracted angle, respectively, of the incident light at said first interface and T1 is a thickness of said second insulation film.

7. The image projection system according to claim 6, wherein said first, second and third interfaces each have respective slope portions that are inclined from said flat top surface at a same angle in the vicinity of the edge of said opening area.

8. An electro-optical display device comprising an electro-optical substance layer, first and second substrates sandwiching therebetween said electro-optical substance layer, a shield film for forming a shielded area shielded from incident light, a shielded element disposed in said shielded area, and a pixel area disposed outside said shielded area, said first substrate mounts thereon a planarization film having a refractive index n1 which is substantially equal to a refractive index of said first substrate, a first insulation film having a refractive index n2 which is higher than the refractive index n1, and a second insulation film having a refractive index substantially equal to the refractive index n1, which are arranged in this order as viewed from said electro-optical substance layer, said planarization film, said first insulation film and said second insulation film forming a slope portion inclined from a surface of said first substrate and disposed within said opening area, said shielded element having an inner edge located apart from an outer edge of said slope portion of said planarization film near said shielded area, as viewed in a direction parallel to said first substrate, by a distance X expressed by:

$X (T1/\cos\beta) \times (\sin(\alpha-\beta))$, where $\alpha$ is an angle of said slope portion with respect to a surface of said first substrate, T1 is a thickness of a portion of said first insulation film near said slope portion, $\beta = \arcsin[(n1/n2) \times (\sin\alpha)]$; and $\arcsin(n1/n2) < \beta < 90$.

* * * * *